US012559181B2

(12) United States Patent　　(10) Patent No.:　US 12,559,181 B2
Danneberg et al.　　　　　　　(45) Date of Patent:　　Feb. 24, 2026

(54) CENTRAL CONNECTION OF AN ENERGY STORAGE STRUCTURE IN A VEHICLE FLOOR

(71) Applicant: Bayerische Motoren Werke Aktiengesellschaft, Munich (DE)

(72) Inventors: Jan Danneberg, Munich (DE); Christian Mangold, Hilgertshausen (DE); Josef Stenger, Raubling (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 381 days.

(21) Appl. No.: 18/023,421

(22) PCT Filed: Aug. 6, 2021

(86) PCT No.: PCT/EP2021/072067
　　§ 371 (c)(1),
　　(2) Date: Feb. 27, 2023

(87) PCT Pub. No.: WO2022/043031
　　PCT Pub. Date: Mar. 3, 2022

(65) Prior Publication Data
　　US 2023/0303188 A1　　Sep. 28, 2023

(30) Foreign Application Priority Data
　　Aug. 28, 2020　(DE) ..................... 10 2020 122 515.6

(51) Int. Cl.
　　B60K 1/04　　　　(2019.01)
　　B62D 25/20　　　(2006.01)

(52) U.S. Cl.
　　CPC ................ B62D 25/20 (2013.01); B60K 1/04 (2013.01); B60K 2001/0438 (2013.01)

(58) Field of Classification Search
　　CPC ... B62D 25/20; B60K 1/04; B60K 2001/0438
　　(Continued)

(56) References Cited

U.S. PATENT DOCUMENTS 7,118,168 B2 * 10/2006 Vincenti ............ B62D 25/2036
　　　　　　　　　　　　　　　　　296/193.07
7,677,643 B2 * 3/2010 Nakamura ............. B62D 25/20
　　　　　　　　　　　　　　　　　296/187.08

(Continued)

FOREIGN PATENT DOCUMENTS

DE　　10 2005 027 936 A1　　1/2006
DE　　10 2007 058 250 A1　　6/2008
(Continued)

OTHER PUBLICATIONS

International Search Report (PCT/ISA/210) issued in PCT Application No. PCT/EP2021/072067 dated Nov. 8, 2021 with English translation (six (6) pages).

(Continued)

*Primary Examiner* — Joseph D. Pape
(74) *Attorney, Agent, or Firm* — Crowell & Moring LLP

(57) ABSTRACT

A vehicle floor has a carrier beam structure that has a plurality of beams; a floor structure that has at least one floor panel; and an energy storage structure that is fastened to an underside of the beam structure and/or the floor structure such that the energy storage structure is supported on a support region of the floor panel by at least one support arrangement, in particular at least one elastomer element.

10 Claims, 3 Drawing Sheets

(58) Field of Classification Search
USPC ........................................................ 296/204
See application file for complete search history.

(56)                    References Cited

U.S. PATENT DOCUMENTS

| | | | |
|---|---|---|---|
| 9,045,030 | B2 | 6/2015 | Rawlinson et al. |
| 9,281,505 | B2 * | 3/2016 | Hihara .................... B62D 25/20 |
| 10,173,511 | B2 * | 1/2019 | Hara ....................... B60L 50/66 |
| 10,476,061 | B1 * | 11/2019 | Groebl .................... B60L 50/66 |
| 2008/0136110 | A1 | 6/2008 | He |
| 2013/0037337 | A1 | 2/2013 | Auer et al. |
| 2014/0287290 | A1 | 9/2014 | Haijima et al. |
| 2017/0305250 | A1 | 10/2017 | Hara |
| 2020/0198453 | A1 | 6/2020 | Hilfrich et al. |
| 2020/0282817 | A1 | 9/2020 | Becker et al. |

FOREIGN PATENT DOCUMENTS

| | | |
|---|---|---|
| DE | 10 2017 206 586 A1 | 10/2017 |
| DE | 10 2017 103 653 A1 | 8/2018 |
| EP | 1 564 058 A1 | 8/2005 |
| JP | 2006-182295 A | 7/2006 |
| JP | 2009193942 * | 8/2009 |
| JP | 2014-22157 A | 2/2014 |
| JP | 2018-193026 A | 12/2018 |
| WO | WO 2019/121077 A1 | 6/2019 |

OTHER PUBLICATIONS

German-language Written Opinion (PCT/ISA/237) issued in PCT Application No. PCT/EP2021/072067 dated Nov. 8, 2021 (eight (8) pages).
German-language Office Action issued in German Application No. 10 2020 122 515.6 dated Apr. 6, 2021 (four (4) pages).
English translation of Chinese-language Office Action issued in Chinese Application No. 202180042374.8 dated May 27, 2025 (6 pages).

* cited by examiner

B – B

C – C

CENTRAL CONNECTION OF AN ENERGY STORAGE STRUCTURE IN A VEHICLE FLOOR

BACKGROUND AND SUMMARY

The invention relates to a vehicle floor with a beam structure, a floor structure, and an energy storage structure, and to a motor vehicle with such a vehicle floor.

U.S. Pat. No. 9,045,030 B2 discloses a motor vehicle in which a housing with a cover is arranged on an underside of a floor of a chassis. Batteries for an electric drive unit of the motor vehicle are arranged in the housing.

In order to prevent undesired acoustic effects when such a motor vehicle is being driven, a central connection may be necessary for such an energy storage structure, in the form of a flat storage cell, in a vehicle floor. As a result, the vibration-critical chassis floor panel can be coupled to the rigid high-voltage storage cell and the whole system can consequently be acoustically detuned as desired. It is critical here both to configure the connection region so that it is as rigid as possible and also to distribute the forces transmitted to the chassis by the central connection over a large area in order to reduce voltage peaks.

WO 2019/121077 A1 discloses a motor vehicle with a chassis, in which the chassis comprises a passenger compartment, wherein the passenger compartment has a floor structure, and wherein a housing structure for energy storage cells is fastened on an underside of the floor structure. The housing structure is a closed container which has a trough-shaped component and a cover spaced apart from the trough-shaped component, wherein at least one damping component, which is installed in the intermediate space between the cover of the housing structure and the floor under pretension, is arranged in an intermediate space between the underside of the floor and an outer surface of the cover of the housing structure. The damping component is a compressible foam, wherein the compressible foam is an elastomeric foam, the material properties of which under dynamic load include dynamic hardening such that the rigidity under dynamic load beyond a threshold frequency is greater by a dynamic hardening factor than the rigidity which exists under quasi-static load, as is the case, for example, during mounting.

A relatively high surface pressure is applied to the relatively thin chassis floor panel by the central connection, in particular in high-frequency load cases, in other words when driving quickly and/or over an uneven surface. There is a risk here of exceeding the material strength of the chassis floor panel and consequently plastically deforming the chassis floor panel such that there is even the possibility of cracking in unfavorable situations. Chassis floor panels furthermore often have a large area and are hence vibration-critical. In order to be able to take advantage of the central connection between the energy storage structure and the vehicle floor of the vehicle chassis as acoustically effectively as possible, the connection region should be configured so that it is as rigid as possible on the chassis side.

However, an approach in which the rigidity of the chassis floor panel is increased simply by thickening the floor panel causes a huge increase in weight in the order of between one and four kilograms such that this is not an advantageous option in modern motor vehicles optimized for lightweight construction.

Against this background, an object of the invention is to improve a vehicle floor of a motor vehicle.

This object is achieved by a vehicle floor and by a motor vehicle with the features of the independent claims. The dependent claims relate to advantageous developments of the invention.

According to one aspect, a vehicle floor is provided.

The vehicle floor includes a beam structure with a plurality of beams, in particular longitudinal beams and/or cross beams for absorbing loads occasioned when driving and/or from the weight of vehicle components and occupants.

The vehicle floor includes a floor structure with at least one floor panel for closing a passenger compartment with respect to the environment, wherein in particular the floor panel is arranged between two or more beams of the beam structure in order to completely or partially close the intermediate space between the beams.

The vehicle floor includes an energy storage structure which is fastened, in particular screwed or welded, on an underside of the beam structure and/or the floor structure such that the energy storage structure is supported via at least one support arrangement, in particular an elastomeric element, on a support region of the floor panel, in particular with the application of a compressive (tensile) force, for example by means of a screwed or welded connection.

An, in particular, additional stiffening element is arranged on the floor panel in the support region.

In the present case, a vehicle floor is to be understood as a lower region of a vehicle chassis, wherein the vehicle chassis has in particular a beam structure with beams and a covering structure with covering panels, wherein the floor structure is in particular part of this covering structure. In addition, in the present case, the vehicle chassis has the energy storage structure fastened to the vehicle floor.

According to a further aspect, the motor vehicle is supplied with an electric drive unit, i.e. in particular a pure battery electric motor vehicle (BEV) or a hybrid vehicle with an internal combustion engine and battery-powered electric machine (for example, PHEV) which has a vehicle floor according to one embodiment of the invention.

The invention is now based, inter alia, on the concept that, via an additional chassis component which, according to an embodiment using weld spots, is attached in particular to the floor panel in the region of the central connection, on the one hand the transmitted force is distributed over a large area and the local load on the chassis floor panel is reduced, and on the other hand the chassis floor panel which is vibration-critical because it has a large area is stiffened.

The rigidity can be significantly increased by the connection of the additional chassis component according to an embodiment to existing cross and/or longitudinal beam structures, and by the construction of an additional profile cross-section with the stiffening element according to an embodiment. The stiffening element thus represents an important constituent of the overall acoustic design of the central connection.

In the case of an exemplary vehicle floor, the stiffening element is spot-welded to the floor panel in the region of the central connection by 10 to 20 weld spots. The wall thickness and/or the material quality of the panel components is optimized according to one embodiment such that the weight loading in the vehicle is minimal and at the same time plastic deformation is prevented during the mounting of the high-voltage storage cell. In the case of this vehicle floor, an optimum wall thickness of the stiffening element of approximately 1.5 mm in an embodiment as a steel panel, in particular with the material CR460LA-G150/50-U has been established.

A front flange of the stiffening element is, according to an embodiment, connected to the rear seat cross beam, and the two side flanges are connected respectively to the longitudinal beams of an extension piece of the engine mount and to the bracket of the gearbox mount. A profile cross-section of the stiffening element configured as an additional panel has an extent in the vertical direction of the vehicle of a good 5 mm.

According to an embodiment, the vehicle floor is part of a vehicle chassis which defines in particular a passenger compartment. According to an embodiment, the energy storage structure is fastened to an underside of the vehicle floor. The energy storage structure is in particular configured to accommodate energy storage cells and, according to an embodiment, has a housing structure within the sense of a closed container which typically has a trough-shaped component.

The trough-shaped component has, for example, peripheral side walls and a floor arranged on the side walls. In addition, according to an embodiment, the energy storage structure has a storage cell cover which covers the interior of the trough-shaped component.

According to an embodiment, at least one support arrangement, designed in particular with a damping component such as, for example, an elastomeric element, is arranged in an intermediate space between the underside of the floor structure, in particular a floor panel, and an outer surface of the cover of the housing structure in order to obtain a central connection.

According to an embodiment, the support arrangement is installed with pretension in the intermediate space between the housing structure and the floor structure. This can be achieved in particular by a screwed connection or by a welded connection of the housing structure to the floor structure with a pretensioned support arrangement.

According to an embodiment, the damping component is an elastomeric element, in particular a compressible foam. The compressible foam of the damping component is advantageously an elastomeric foam, the material properties of which, according to one embodiment, include dynamic hardening under dynamic load such that the rigidity under dynamic load beyond a frequency of greater than 0.1 Hz is greater, by a dynamic hardening factor which is in particular more than two, than the static rigidity which exists under quasi-static load, as is the case during mounting. Such a damping component per se is shown, for example, in WO 2019/121077 A1. Damping components disclosed therein can be used as a support arrangement, in particular as an elastomeric element, according to an embodiment when implementing the invention.

The property of dynamic hardening of the compressible foam of the damping component means that the rigidity under dynamic load is greater than under quasi-static load. Consequently, in the case of quasi-static loading, as is the case during quasi-static mounting, it results that a lower force is required to compress the damping component. Under dynamic loading, with an applied frequency of greater than 0.1 Hz, dynamic hardening occurs which causes a reduction in vibration because of the increased rigidity.

According to an embodiment, the stiffening element is supported on the beam structure and/or on the floor panel. As a result, stiffening of the floor panel, matched in particular specifically to the force transmission by the support arrangement, is achieved.

According to an embodiment, the stiffening element is a panel, in particular with a wall thickness of 1 to 3 millimeters (mm), for example 1.5 mm. A trade-off between stiffening and the additional weight that results therefrom is thus resolved in an optimized fashion.

According to an embodiment, the stiffening element is a profiled panel, in particular with profiling, with a vertical extent, in particular with respect to a vertical direction of the vehicle, of in particular 3 to 20 mm, for example 5 mm. As a result, the stiffening effect in particular with respect to the transmission of force can be increased by the support arrangement in the vertical direction of the vehicle (which in most exemplary applications represents the main direction in which force is transmitted).

According to an alternative embodiment, the stiffening element is a beam, in particular a beam of the beam arrangement. This can be provided, for example, when the vehicle configuration means that the central connection is provided in the region of a beam which is present anyway. In this case, the beam is then specifically configured, in particular reinforced, to absorb the forces to be transmitted.

According to an embodiment, the support region is spaced apart, with respect to a longitudinal direction of the vehicle, from all the cross beams of the beam structure, i.e. in particular such that the extent in the longitudinal direction of the vehicle of the beam, on the one hand, and of the support element, on the other hand, do not intersect. The attachment point for the central connection can consequently be chosen freely.

According to an embodiment, the stiffening element is fastened to one or two longitudinal beams and/or to one or two cross beams of the beam structure. According to an embodiment, the stiffening element is additionally or alternatively fastened to the floor panel. The flow of force is consequently ensured when stiffening the vehicle floor.

According to an embodiment, the stiffening element is welded, in particular spot-welded, for fastening it to the beam structure and/or the floor structure. In particular, the stiffening element is fastened to a rear seat cross beam and/or to a longitudinal beam, in particular as an extension thereof, of the engine mount and/or to a bracket of a gearbox mount. This enables a reliable and durable connection with a low additional weight contribution.

Further advantages and possible applications of the invention emerge from the following description in conjunction with the drawings.

DETAILED DESCRIPTION OF THE DRAWINGS

Figure 1:
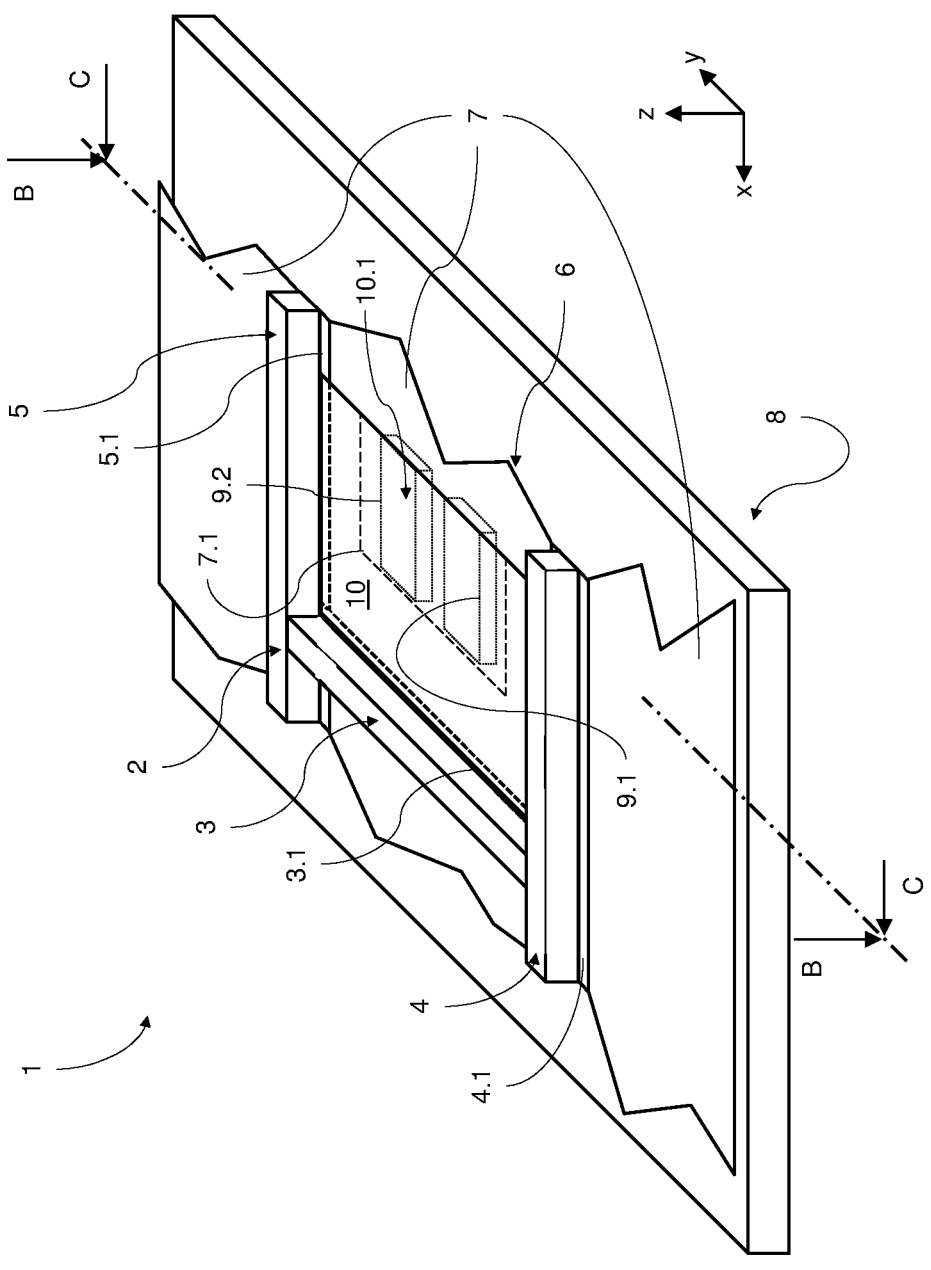
FIG. 1 shows a section of a vehicle floor according to an exemplary embodiment of the invention in a perspective oblique view.
Figure 2:
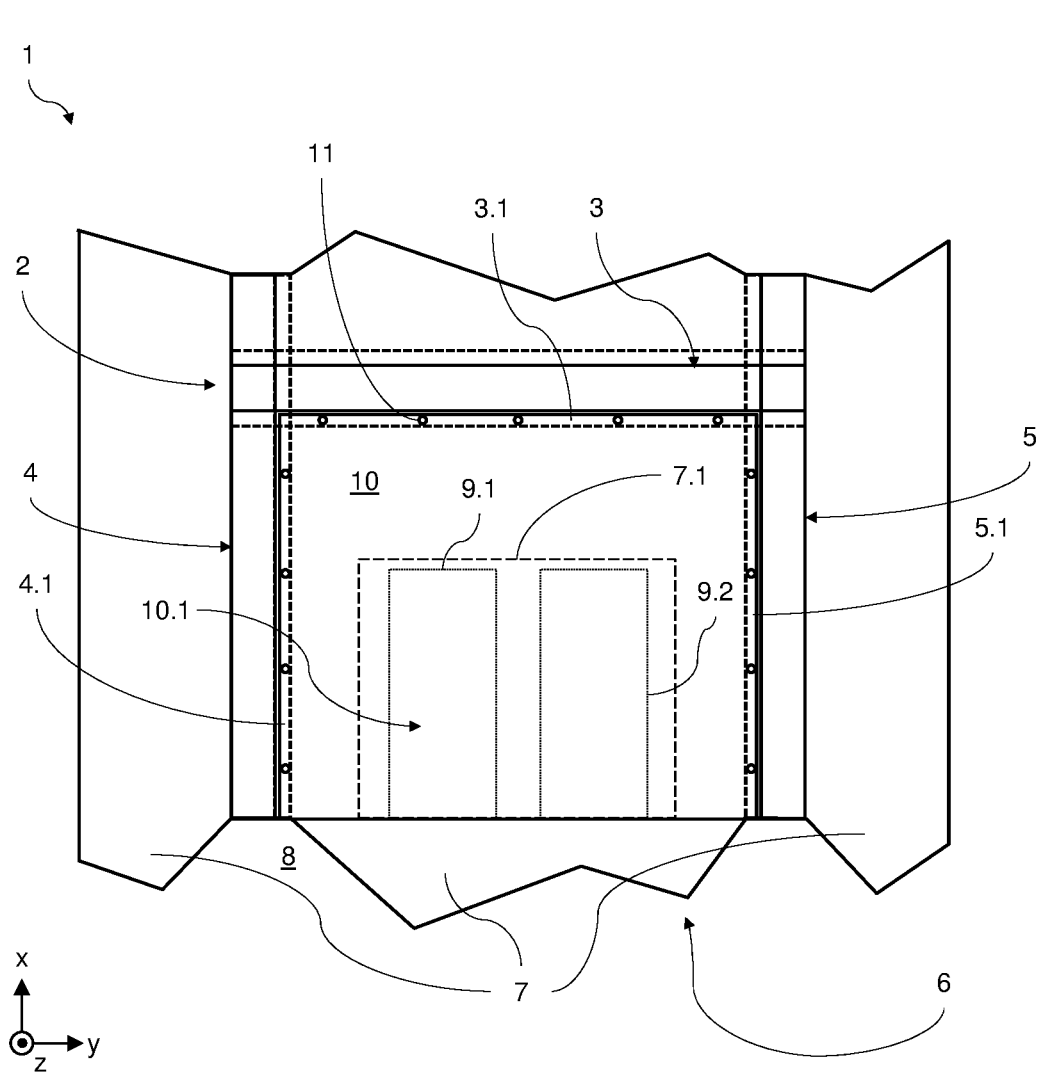
FIG. 2 shows the vehicle floor in a view from above onto the plane of the drawing of FIG. 1 (compare cross-section B-B).
Figure 3:
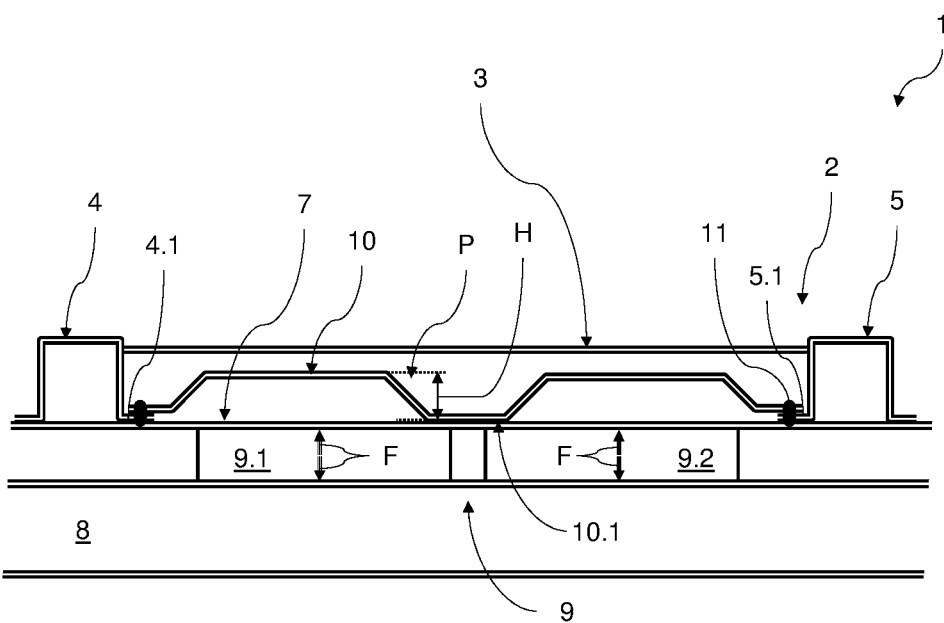
FIG. 3 shows the vehicle floor in a view in section perpendicular to the plane of the drawing of FIG. 1 at the cross-section C-C.
Figure 3:
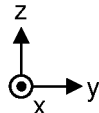

FIG. 1 shows a section of a vehicle floor 1 of a motor vehicle which is not illustrated further with an electric machine which can be driven by battery-based energy storage cells.

The vehicle floor 1 has a beam structure 2 with a plurality of beams 3, 4, 5 for absorbing loads when driving. Illustrated by way of example is a rear seat cross beam 3, an extension beam 4 of an engine mount, not illustrated further, of the motor vehicle, and a bracket beam 5 of a gearbox mount which is not illustrated further.

The vehicle floor 1 moreover has a floor structure 6 with at least one floor panel 7 for closing a passenger compartment, arranged above the floor structure 6 with respect to a vertical direction z of the vehicle, relative to an environment of the motor vehicle. The floor panel 7 is arranged between the beams 3, 4, 5 in order to close the intermediate space between the beams.

Each beam 3, 4, 5 has in each case a flange 3.1, 4.1, or 5.1 facing the floor panel 7. In the exemplary embodiment, the floor panel 7 is connected to the respective beam 3, 4, 5 at the flanges 3.1, 4.1, and 5.1 by being spot-welded.

The vehicle floor 1 additionally has an energy storage structure 8 which is fastened, with respect to a vertical direction z of the vehicle, on an underside of the beam structure 2 and the floor structure 6 by means of screw connections (not illustrated).

The energy storage structure 8 is supported via a support arrangement 9 which, in the exemplary embodiment, is formed with two elastomeric elements 9.1 and 9.2, on a support region 7.1 of the floor panel 7.

By means of the screwed connection between the energy storage structure 8, on the one hand, and the beam structure 2 or the floor structure 6, on the other hand, a compressive force F is applied to the elastomeric elements 9.1 and 9.2 via which a central region of the energy storage structure 8 is supported on the floor panel 7.

In order to be able to absorb the force peaks which occur here, in particular when driving, reliably and without plastic deformation of the floor panel 7, a stiffening element 10 is arranged on the floor panel 7 in the support region 7.1 of the floor panel 7.

The stiffening element 10 is arranged on a side, facing the passenger compartment, of the floor panel 7 and is supported on the flanges 3.1, 4.1, and 5.1 of the beam structure 2 and/or on the floor panel 7 at a contact point 10.1 itself.

In the exemplary embodiment, the stiffening element 10 is a panel with a wall thickness of 1.5 mm and has a profiling P with a vertical extent H of approximately 5 mm.

The support region 7.1 is spaced apart from all the beams 3, 4, and 5 of the beam structure with respect to a longitudinal direction x of the vehicle and a transverse direction y of the vehicle.

The stiffening element 10 is spot-welded to the beams 3, 4, and 5 via the flanges 3.1, 4.1, and 5.1 by means of weld spots 11. The stiffening element 10 is supported centrally on the floor panel 7 within the sense of a central connection in order to be able to absorb compressive forces F introduced by means of the support arrangement 9 and conduct them away in the flow of forces.

LIST OF REFERENCE SYMBOLS 1 vehicle floor
2 beam structure
3 seat cross beam
3.1 flange
4 extension beam
4.1 flange 5 bracket beam
5.1 flange
6 floor structure
7 floor panel
7.1 support region of the floor panel
8 energy storage structure
9 support arrangement
9.1, 9.2 elastomeric elements
10 stiffening element
10.1 contact point
11 weld spots
F compressive force
H vertical extent of the profiled stiffening element
P profiling
x longitudinal direction of the vehicle
y transverse direction of the vehicle
z vertical direction of the vehicle

The invention claimed is:

1. A vehicle floor, comprising:
a beam structure with a plurality of beams;
a floor structure with at least one floor panel having a support region therein, wherein the support region is spaced apart, with respect to a longitudinal direction of the vehicle, from all cross beams of the beam structure;
an energy storage structure positioned within the support region which is fastened on an underside of the beam structure and/or the floor structure such that the energy storage structure is supported via at least one support arrangement comprising an elastomeric element within the support region of the floor panel; and
a stiffening element arranged on the floor panel and at least partially within the support region.

2. The vehicle floor according to claim 1, wherein the stiffening element is supported on the beam structure and/or on the floor region.

3. The vehicle floor according to claim 1, wherein the stiffening element is a panel.

4. The vehicle floor according to claim 1, wherein the stiffening element is a profiled panel.

5. The vehicle floor according to claim 1, wherein the stiffening element is a beam.

6. The vehicle floor according to claim 1, wherein the support region is spaced apart from all cross beams of the beam structure.

7. The vehicle floor according to claim 1, wherein the stiffening element is fastened on one or two longitudinal beams and/or on one or two cross beams of the beam structure.

8. The vehicle floor according to claim 1, wherein the stiffening element is welded to the beam structure and/or the floor structure.

9. The vehicle floor according to claim 1, wherein the stiffening element is fastened on a rear seat cross beam and/or on a longitudinal beam of an engine mount and/or on a bracket of a gearbox mount.

10. A motor vehicle, comprising:
an electric drive machine; and
a vehicle floor according to claim 1.

\* \* \* \* \*